United States Patent
Daruwalla et al.

(10) Patent No.: US 7,817,540 B1
(45) Date of Patent: Oct. 19, 2010

(54) METHOD AND APPARATUS FOR N+1 RF SWITCH WITH PASSIVE WORKING PATH AND ACTIVE PROTECTION PATH

(75) Inventors: Feisal Daruwalla, Fremont, CA (US);
John T. Chapman, Cupertino, CA (US);
Richard Meller, Sunnyvale, CA (US);
Roland Chan, Mountain View, CA (US);
Nicos Achilleoudis, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1181 days.

(21) Appl. No.: 10/141,893

(22) Filed: May 8, 2002

(51) Int. Cl.
*G01R 31/08* (2006.01)
(52) U.S. Cl. .................................... 370/220
(58) Field of Classification Search ............... None
See application file for complete search history.

(56) References Cited

U.S. PATENT DOCUMENTS

| | | | |
|---|---|---|---|
| 4,885,794 A | 12/1989 | Sgrignoli | 455/5 |
| 5,638,358 A * | 6/1997 | Hagi | 370/228 |
| 5,818,816 A | 10/1998 | Chikazawa et al. | 370/225 |
| 5,974,027 A | 10/1999 | Chapman | 370/228 |
| 5,978,354 A * | 11/1999 | Taketomi et al. | 370/226 |
| 6,163,526 A | 12/2000 | Egoshi | 370/228 |
| 6,870,836 B1 * | 3/2005 | Dyke et al. | 370/355 |
| 7,099,578 B1 * | 8/2006 | Gerstel | 398/5 |
| 2003/0074489 A1 * | 4/2003 | Steger et al. | 710/1 |
| 2003/0138252 A1 * | 7/2003 | Paiam et al. | 398/49 |
| 2003/0179749 A1 * | 9/2003 | Mark et al. | 370/390 |
| 2003/0185204 A1 * | 10/2003 | Murdock | 370/352 |
| 2004/0042387 A1 * | 3/2004 | Geile | 370/206 |
| 2004/0208527 A1 * | 10/2004 | Mantin et al. | 398/33 |
| 2005/0041684 A1 * | 2/2005 | Reynolds et al. | 370/463 |
| 2005/0108582 A1 * | 5/2005 | Fung | 713/300 |
| 2005/0259571 A1 * | 11/2005 | Battou | 370/217 |

* cited by examiner

*Primary Examiner*—Chi H Pham
*Assistant Examiner*—Mohammad S Adhami
(74) *Attorney, Agent, or Firm*—Patterson & Sheridan, LLP

(57) ABSTRACT

The present disclosure relates an improved cable data switching unit that provides a fail-over system whereby one line card can protect a plurality of US (upstream) or DS (downstream) channel line cards, providing N+1 protection, with one linecard being able to protect N number of working linecards. When a failure is detected in a working linecard, the signals being routed by the failing linecards are re-routed seamlessly to a protect linecard. This disclosure provides for data to be passively routed, providing for data flow even if power is lost.

5 Claims, 4 Drawing Sheets

METHOD AND APPARATUS FOR N+1 RF SWITCH WITH PASSIVE WORKING PATH AND ACTIVE PROTECTION PATH

BACKGROUND

1. Field of the Disclosure

The disclosure relates generally to data communications, and in particular, to providing data over cable television networks.

2. The Prior Art

Background

FIG. 1 is a block diagram of a prior art cable switching system 100. The system 100 is typically disposed within a data-over-cable system, such as cable TV or broadband system. An upstream and a downstream data channel are typically provided, with the data flowing from the data provider (the head end side) to the consumer residence referred to as the downstream (DS) channel, and the converse being the upstream (US) channel.

FIG. 1 illustrates an upstream embodiment as indicated by the flow direction of the data. A downstream version will simply have the data flow in the opposite. The unit 100 is typically disposed within a chassis 110, and is fed by upstream data labeled $US_1$ in through $US_n$ in. Each data stream is fed to a corresponding working channel (WC) switch $WC_1$ through $WC_n$. The switches are configured to provide an output $US_1$ out through $US_n$ out, and a protection output to a switch SW. The switches are powered through a power source 120.

In normal operation, the working channel switches $WC_1$ through $WC_n$ feed a corresponding linecard located at the head end. To provide fail-over support, the signal feeding the working channel corresponding to the failed linecard is routed to a redundant linecard through the switch SW in the event that a linecard fails in the head end.

However, the working channel switches $WC_1$ through $WC_n$ are active devices that have a relatively short lifetime. Hence, if the unit loses power, the switches will not function.

BRIEF DESCRIPTION OF THE DRAWING FIGURES

DETAILED DESCRIPTION

Figure 1:
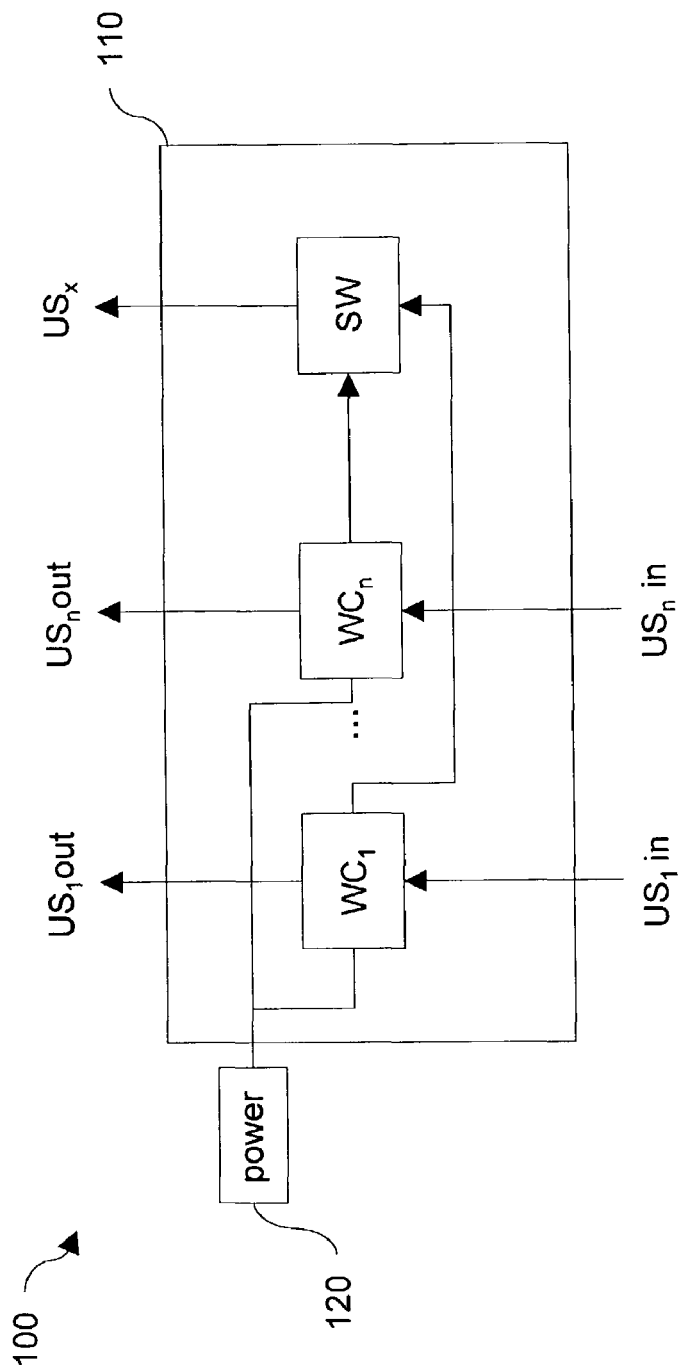
FIG. 1 is a diagram of a prior art switching unit.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

The present disclosure relates an improved cable data switching unit that provides a fail-over system whereby one line card can protect a plurality of US (upstream) or DS (downstream) channel line cards. This is known herein as N+1 protection, with one linecard being able to protect N number of working linecards.

When a failure is detected in a working linecard, the signals being routed by the failing linecards must be re-routed seamlessly to the protect linecard. This disclosure provides for data to be routed even if power is lost to the head end unit.

Figure 2:
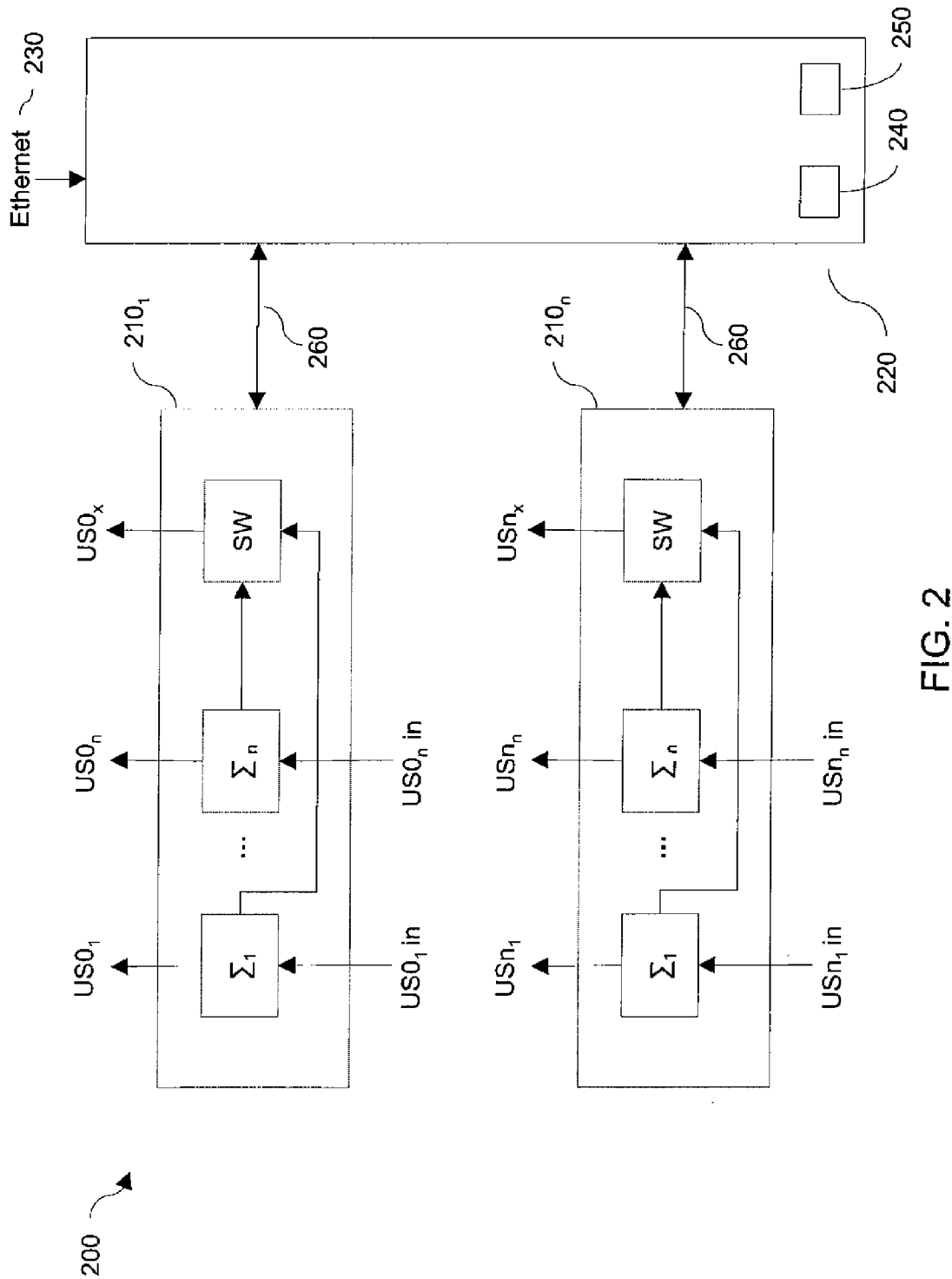
FIG. 2 is a diagram of a switching unit configured in accordance with the teachings of this disclosure.

FIG. 2 is a block diagram of a switching unit 200 configured in accordance with the teachings of this disclosure. The switching unit 200 is preferably disposed in a cable data system between a head end and customer drops. Head end units suitable for use with the disclosed system are manufactured by many sources, including a Cable Modem Terminating System (CMTS) from Cisco Systems, Inc., that houses line cards to service the various US and DS channels.

The unit 200 includes at least one switching module $210_1$ through $210_n$ for processing a particular channel of data. Any number of switching modules $210_n$ may be included; in one aspect the unit 200 includes 8 modules for switching 8 channels US0-US7. Each switching module 210 includes a passive splitter $\Sigma_1$ through $\Sigma_n$. The splitters $\Sigma$ are preferably configured to passively split the input upstream (otherwise referred to herein as a working channel) signal $USO_1$ through $USO_n$, and provide a linecard output $USO_1$ through $USO_n$, and a protect output to a protect switch SW.

The protect switch SW is configured to provide a protect output $USO_X$ to a head end unit linecard. The protect switch may be an active switch as is known in the art.

The unit 200 includes a control module 220 for controlling the switching operation of the unit 200. The control module 220 may contain a processor 240 and associated memory 250 for storing and retrieving instructions for operating the unit 200 as disclosed herein. The control module 220 is operatively coupled to the various modules 210, and in particular is configured to selectively switch the protect switches SW. The control module 220 may be coupled to the various switching modules 210 through an internal link 260.

The control module is also configured to be networked to the head unit through an Ethernet connection 230. The control module 220 is also configured to receive commands from the head unit, and selectively switch the protect switches SW in response to commands from the head unit. In one aspect, the control module 220 is configured to communicate the head unit using the Simple Network Management Protocol (SNMP).

The unit 200 may be deployed within a chassis, and be configured to provide necessary power requirements to the switching and control modules.

The chassis may comprise a chassis configured to house blade-style line cards as is known in the art. In one aspect, the unit 200 may be housed in a chassis that is two standard rack units in height.

In operation, the system 200 is configured to operate in an upstream mode with the customer upstream inputs $USO_{1\ in}$ through $USn_{n\ in}$ being coupled to a corresponding passive splitter Σ. The consumer upstream data is provided to the passive splitter Σ which divides the signal into two outputs, and provides the data to both a corresponding linecard in the head end unit, and to the protect switch SW. Thus, one of the split data streams is provided as an output signal to the head end unit, such as a CMTS linecard, while the other output is provided as a protect output to an active protector switch SW. The switch functions as a N-to-1 selector, providing a selected data stream to the protect, or redundant, linecard.

The head end unit may control the switching unit 200 system via the Ethernet connection 230. If a linecard in the head end is found to be failing, the head unit will initiate a fail-over operation by switching data from the failing linecard to a redundant linecard by switching the data to the $USO_X$ data path. It is contemplated that the head end unit will provide the intelligence for the system as a whole, and will be configured to determine when a linecard is failing. Thus, the switching unit 200 may be configured to provide a protect output to the head unit in response to communications received from the head unit. The switching should preferably take place within 50 ms to provide uninterrupted service to customers.

As will be appreciated by those of ordinary skill in the art, the embodiment of FIG. 2 may serve as a downstream switching system by reversing the direction of the data flow. In such a downstream case, the passive splitters of the switching modules will serve as combiners, summing the downstream inputs for delivery to the customers.

Figure 3:
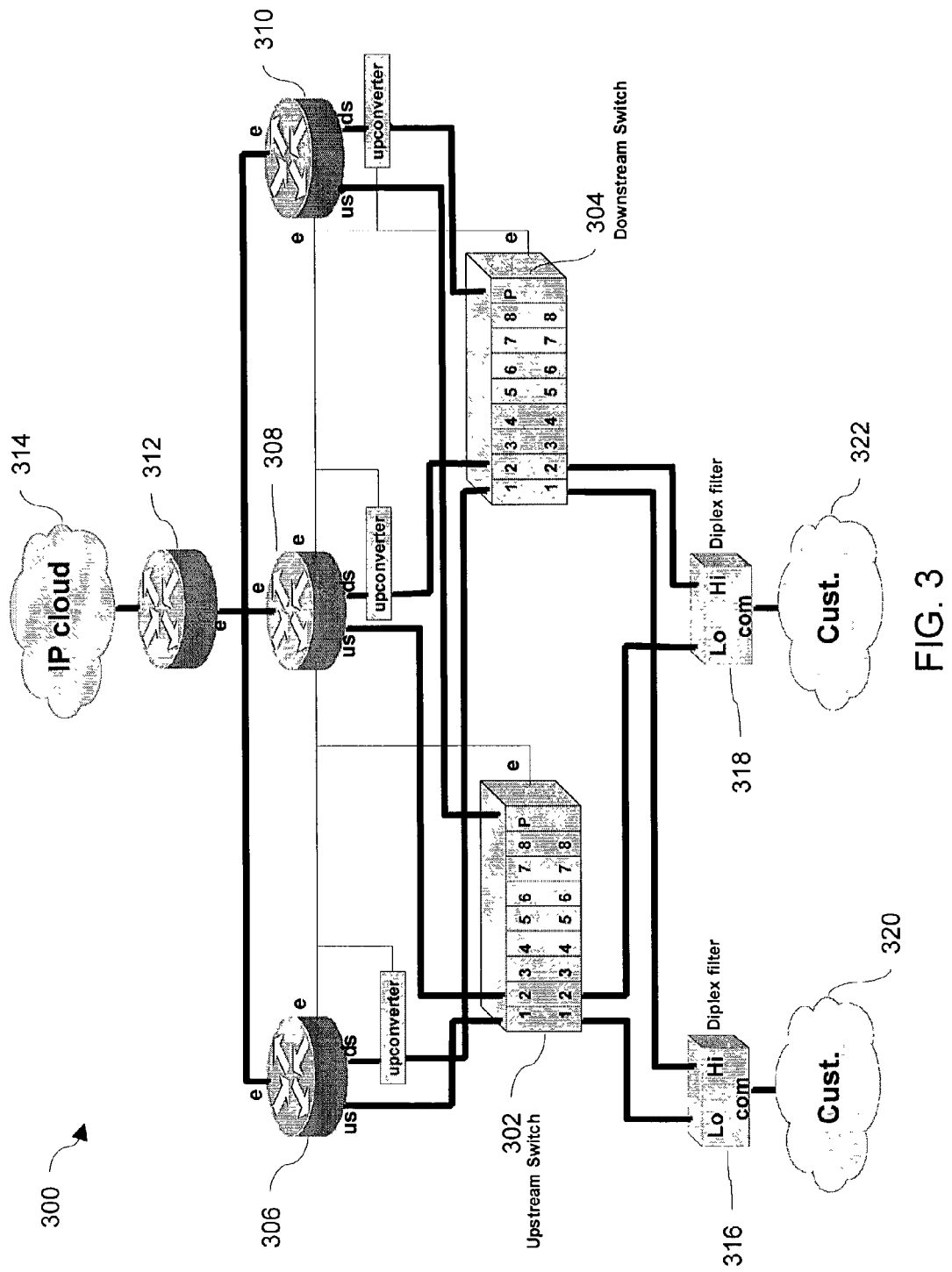
FIG. 3 is a diagram of a switching system configured in accordance with the teachings of this disclosure.

FIG. 3 is a schematic diagram of a system 300 configured in accordance with the teachings of this disclosure. FIG. 3 illustrates one aspect of how the switches of this disclosure may be deployed within a cable data transmission system.

The system 300 includes an upstream switch 302 and a downstream switch 304, each configured as disclosed herein. The switches 302 and 304 are depicted as each having working channels 1-8 and a protect channel P. It is to be understood that any number of channels may be deployed within the switches 302 and 304.

The individual channels of the switches 302 and 304 are each coupled to a corresponding working head unit. For sake of brevity, a first working head unit 306 and a second working head unit 308 are shown coupled to the first and second working channel of the switches 302 and 304, respectively. The system 300 also includes a protect head end 310, coupled to the protect channel P of each of the switches 302 and 304. It is to be understood the corresponding working head ends would be provided for each working channel of the switches 302 and 304.

The working channel head ends 306 and 308 and the protect head end 310 are each coupled to an aggregate router 312 that is configured to provide connectivity to the IP cloud 314 as is known in the art.

FIG. 3 shows that connectivity in the system 300 may be achieved through multi-channel data streams, indicated through thick lines, or through an Ethernet-compliant connection, indicated through thin lines. The data lines in FIG. 3 are labeled with an "e" to indicate Ethernet-compliant links, and "us" and "ds" to indicate upstream or downstream data lines respectively. FIG. 3 also shows that upconverters may be employed as necessary to upconvert data streams to the appropriate cable data format.

To provide service to the customer side of system 300 the working channels of switches 302 and 304 are coupled to a diplex filer 316 and 318, respectively. As is appreciated by those of ordinary skill in the art, a diplex filter prevents low frequency energy from interfering with high frequency energy, and visa versa. As the data may be coupled to a common port, such interference is undesirable. Typically, the US channel utilizes the low frequency spectrum, and the DS channel utilizes the high frequency spectrum.

The filters 316 and 318 are then coupled to customer clouds 320 and 322, respectively.

In operation, should a linecard in one of the working head ends 306 or 308 fail, the head ends will instruct the appropriate switch 302 or 304 to switch the data of the channel being served by the failing linecard to the protect channel P of the switch 302 or 304. The switched data will now be routed through the protect channel P of the switch 302 or 304 through the protect head end 310.

As is known by those of ordinary skill in the art, the switching units 302 and 304 may be remotely deployed near customer drops and may be susceptible to power fluctuations or power loss. Should a linecard fail and the protection scheme described above employed, the switching units 302 and 304 of this disclosure will still be able to provide service in the event of power abnormalities because of the passive nature of the switches as described herein.

Figure 4:
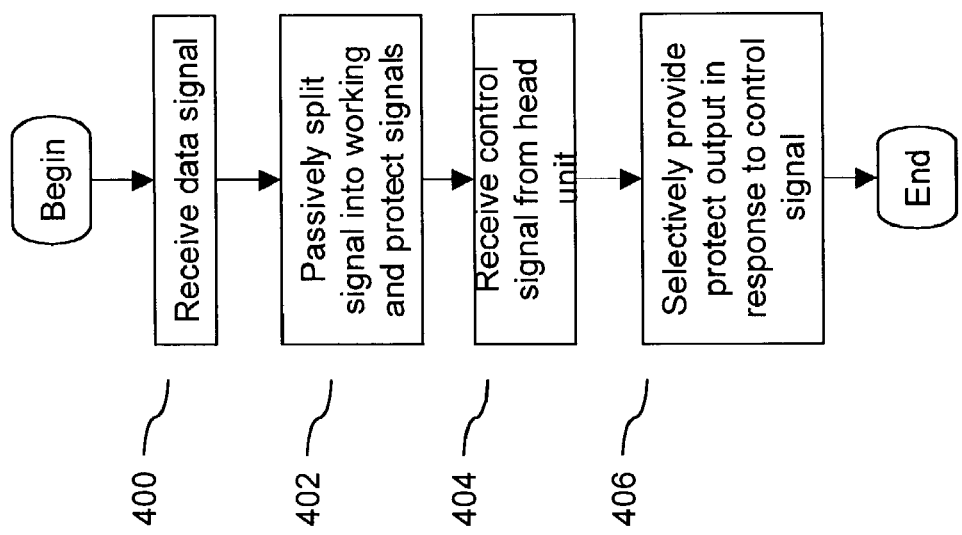
FIG. 4 is a flow diagram of a method of providing N+1 protection in a cable data switching system.

FIG. 4 is a flow diagram for one aspect of a method of providing a N+1 RF switching. The process may begin in act 400, where the system receives a data signal. In act 402, the system is configured to passively split the received data signal into a linecard (or working) output and a protect output. Meanwhile, in act 404, the system is receiving a control signal from a head unit. In act 406, in response to the control signal received from the head unit, the system will selectively provide the protect output to the head unit. As the protect output has access to all of the working signals, the system will provide all working channels through a passive working path to the head unit, while selectively switching a desired working channel through the protect path. In one aspect disclosed herein, once the desired working channel has been routed to the protect output, power is no longer required to maintain signal flow due to the passive nature of the disclosed system. The process of FIG. 4 may be performed by the structure as disclosed herein.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A cable data switch, comprising:
   a switching module comprising a passive splitter/combiner and a protect switch,
   where the passive splitter/combiner passively splits a plurality of customer signals received on an upstream channel into a plurality of working signals and a plurality of protected signals and provides the plurality of working signals to a plurality of working head end units and the plurality of protected signals on a protect output, the protect output being provided to the protect switch, where the protect switch provides one of the plurality of protected signals to a protect head end unit,
   where the passive splitter/combiner passively combines a plurality of working signals received from the plurality of working head end units with a downstream protected signal received from the protect switch into a plurality of customer signals, and provides the plurality of customer signals on the upstream channel, where the protect switch receives the downstream protected signal from the protect head end unit; and a control module coupled to the switching module, the control module being configured to receive a plurality of control signals from the plurality of working head end units and to selectively control the protect switch to provide the downstream protected signal to the passive splitter/combiner or to provide one of the plurality of protected signals to the protect head end unit in response to a control signal from a member of the plurality of working head end units.

2. The cable data switch of claim 1, where the switching module combines and splits signals independent of a supply of power.

3. The cable data switch of claim 1, where the plurality of working head end units are configured to communicate with the control module using Simple Network Management Protocol (SNMP).

4. The cable data switch of claim 3, where the plurality of working head end units communicate with the control module over an Ethernet-compliant link.

5. The cable data switch of claim 1, where the member of the plurality of working head end units provides the control signal in response to a failure of a line card in the member working head end unit, where the failure of the line card results in a loss of a working signal from the member working head end unit or the member working head end unit failing to route the working signal received from the passive splitter/combiner.

* * * * *